Dec. 17, 1968       W. J. PIETRUCHA       3,416,455
HYDRAULICALLY ACTUATED SEALING MEANS FOR ROTATING EQUIPMENT
Filed March 15, 1967

WILLIAM J. PIETRUCHA
INVENTOR.

BY Daniel H. Bobis
Atty

United States Patent Office 3,416,455
Patented Dec. 17, 1968

3,416,455
HYDRAULICALLY ACTUATED SEALING MEANS FOR ROTATING EQUIPMENT
William J. Pietrucha, Paramus, N.J., assignors to Worthington Corporation, Harrison, N.J., a corporation of Delaware
Filed Mar. 15, 1967, Ser. No. 623,363
16 Claims. (Cl. 103—111)

ABSTRACT OF THE DISCLOSURE

A sealing device having cooperating stationary and movable sealing elements adapted for installation in rotating equipment. The cooperating elements of the sealing device are placed in operative association by fluid forces acting within the device. These forces result from the structure or operation of the associated rotating equipment or a combination of both.

FIELD OF INVENTION

The invention resides in the category of apparatus which acts at the juncture of adjacent members to oppose the passage of fluids therebetween and comprises structure having relatively rotatable members presenting complementary sealing surfaces normal to or at an angle to the axis of rotation and further comprising means responsive to fluid pressure which effect coaction between the cooperating sealing surfaces.

Heretofore, sealing devices utilized spring means or other resilient means to provide the necessary contacting force between the relatively rotatable members of the device. These resilient means were subject to fatigue and wear and often to loss of resiliency after extended use. Therefore, frequent inspection and replacement of these resilient means was necessary. Furthermore, operating characteristics of these sealing devices often varied with service life since wear on the complementary sealing surfaces required greater extension of the resilient means resulting in reduced contacting force and therefore, reduced sealing efficiency.

SUMMARY OF THE INVENTION

The present invention sets forth a sealing device having relatively rotating cooperating sealing elements which are urged into operative association by fluid forces acting within the sealing device. The sealing device is adapted for installation in rotating equipment. Means forming a chamber within the device is disposed so that fluid in the chamber is pressurized by the forces associated with operation of the rotating equipment and by the static fluid forces adjacent the sealing device. The fluid in the chamber when pressurized causes at least one wall of the chamber to expand. The expandible wall is operatively associated with the relatively rotating sealing element and urges these elements into operative coaction.

It is, therefore, an object of this invention to provide a sealing device for fluids which does not require spring means or resilient means to provide the contacting forces between the complementary sealing surfaces thereof.

It is a further object of the invention to provide a sealing device which utilizes fluid forces to produce coaction between cooperating sealing surfaces.

It is another object of the invention to provide a sealing device having a relatively long service life.

Another object of the invention is to provide a sealing device utilizing fluid forces to maintain sealing contact between relatively rotating sealing elements which device is adaptable for installations which operate intermittently.

Yet another object of the invention is to provide a sealing device for rotating equipment actuated by operation of the rotating equipment which device is adapted to provide operative sealing contact between cooperating sealing elements thereof during periods of non-operation of the rotating equipment.

Still another object of the subject invention is to provide a relatively simple sealing device for sealing a shaft housing containing liquids.

It is another object of the invention to provide a device for sealing the housing about a rotating shaft which is adaptable for use in inaccessable areas due to extended service life.

Still another object of the present invention is to provide a sealing device for sealing shaft housings from liquids having high abrasive material content.

A further object of the invention is a sealing device adapted for sealing shaft housing from extremely corrosive materials.

Other objects and advantages will be apparent from the following description of an embodiment of the invention, and the novel features will be particularly pointed out hereinafter in connection with the appended claims.

DESCRIPTION OF THE PREFERRED EMBODIMENTS

Figure 1:
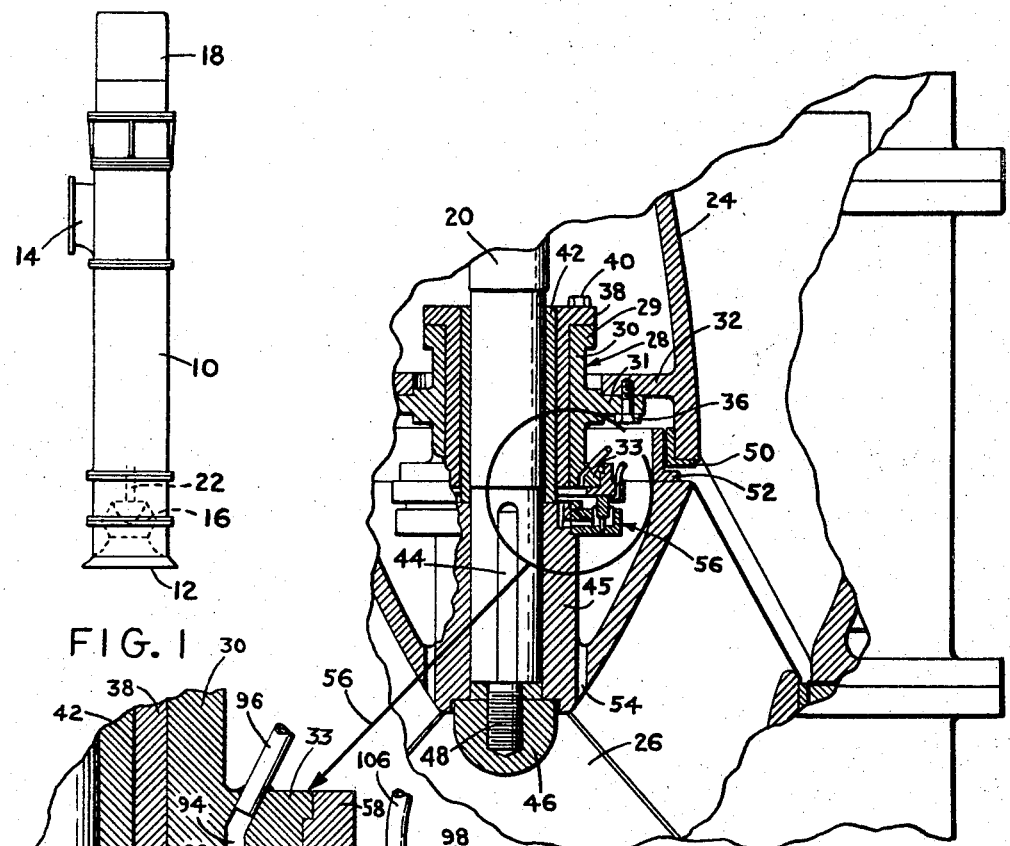
FIGURE 1 is a side elevation of a vertical pump.

FIGURE 1 shows a vertical pump 10 having an inlet 12 and an outlet 14 with a pump section 16 driven by a motor 18 which transmits power through a drive shaft 20 housed in column pipe 22. The lower end of the column pipe ends in a diffuser section 24 which forms a hydrodynamically continuous surface with the impeller 26. A plurality of bearings connected to the column pipe position the drive shaft.

Figure 2:
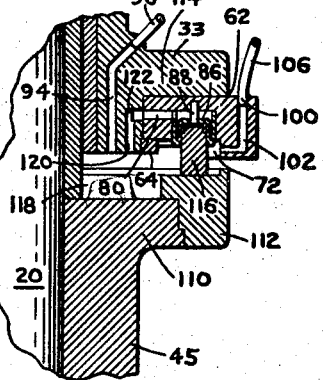
FIGURE 2 is a fragmentary view partially in vertical section of the lower suction end of the pump showing the shaft seal.
Figure 3:
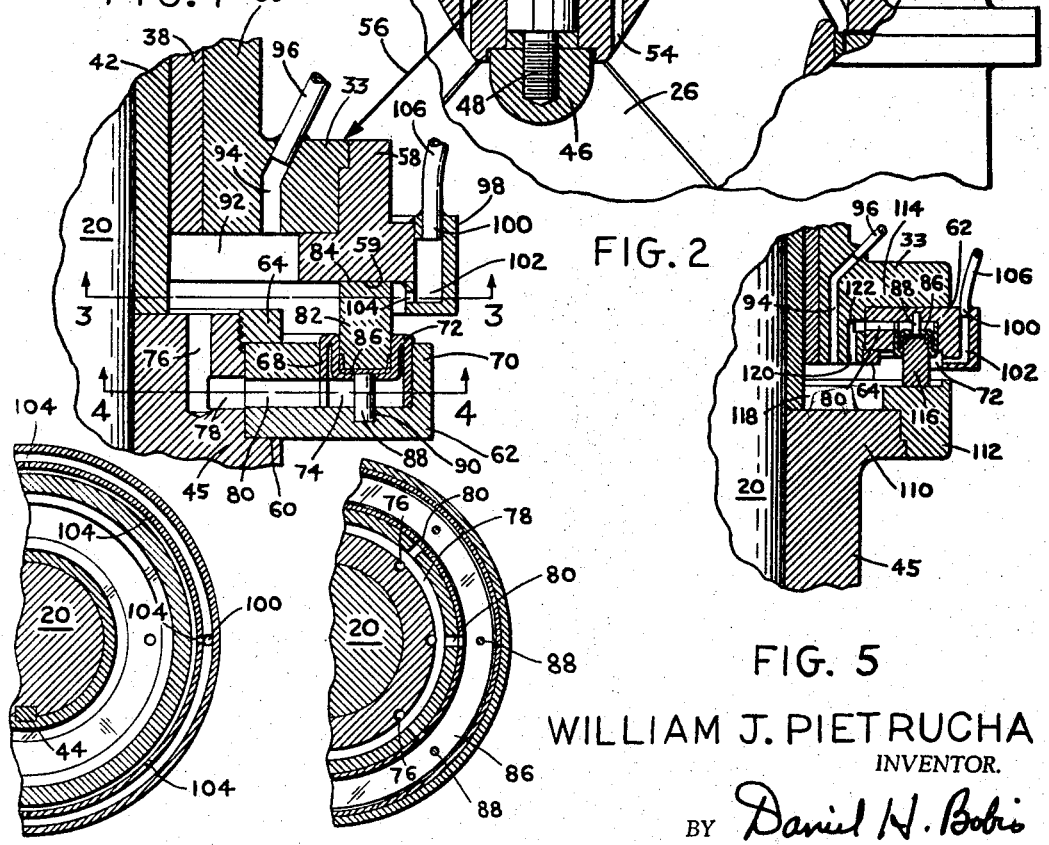
FIGURE 3 is a section taken along line 3—3 of FIGURE 2.
Figure 4:
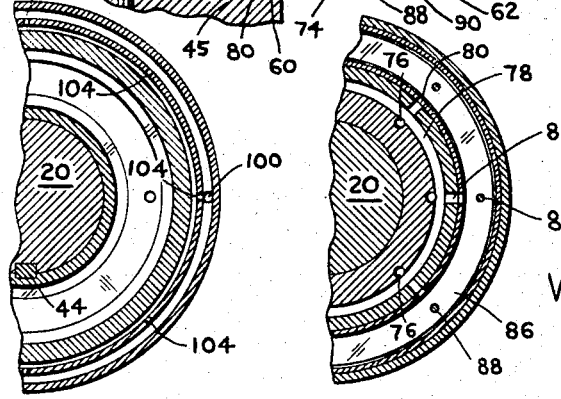
FIGURE 4 is a section taken along line 4—4 of FIGURE 2.

As shown in FIGURE 2, a bearing assembly 28 is composed of a bearing housing 30 having upper, mid and lower flanges 29, 31 and 33, respectively. Mid flange 31 of bearing housing 30 is connected to flange 32 of diffuser 24 by means of a plurality of bolts 36. A bearing bushing 38 is connected to upper flange 29 of beairng housing 30 by a plurality of bolts 40. A shaft bushing 42 is held in assembled position between bearing bushing 38 and shaft 20.

The impeller 26 is attached to the end of the drive shaft 20 by means of a key 44 and an impeller retaining nut 46 threadably engaged with the threaded extension 48 of the drive shaft. A diffuser wearing ring 50 is mounted on the end of the diffuser and an impeller wearing ring 52 is mounted on the end of the impeller adjacent to the diffuser to prevent damage to the permanent parts of the pump. Balance passage 54 is located in the hub of the impeller near the bottom to reduce the forces on the impeller caused by the difference in pressure between the low pressure and the high pressure ends thereof.

The column pipe 22 forms a container about the drive shaft 20 to hold lubricating liquid for the bearings which position the shaft. To prevent excessive leakage of the lubricating fluid from the end of the column pipe and to prevent contamination of the lubricating fluid within the column pipe by the liquid by pumping, it is necessary to seal the diffuser end of the column pipe from the impeller. This is accomplished by means of a fixed and a relatively movable seal.

The fixed seal is composed of mid flange 31 of bearing housing 30 coacting with the diffuser flange 32 to form a tight seal between the diffuser and the bearing housing. The movable seal consists of a seal assembly generally indicating at 56 which forms a seal between the lower flange 33 of bearing housing 30 and seal assembly elements on the hub of the impeller now to be described.

SEAL ASSEMBLY

Seal assembly 56 includes a stationary seal ring 58 connected to lower flange 33 of bearing housing 30 and a mounting ring 62 fixedly connected to and rotable with impeller hub 45 and held in position by means of shoulder 60 and retainer nut 64.

A channel is formed in mounting ring 62 having inner and outer walls 68 and 70 respectively. Flexible diaphragm 72 is connected to inner and outer walls 68 and 70, respectively to form a sealed annular chamber 74 in the channel.

A rotating seal ring 82 having a rubbing surface 84 in coaction with the rubbing surface 59 of the stationary sealing ring 58 is connected to the mounting ring 62 by positioning ring 86 to which it is fastened. The positioning ring 86 is mounted in the mounting ring 62 by a plurality of positioning pins 88 which loosely fit into recesses 90 correspondingly disposed in the bottom of sealed chamber 74.

The positioning pins 88 may be an integral part of the flexible diaphragm 72 or may pass through the flexible diaphragm without disturbing the seal of the sealed chamber 74. If the latter configuration is used, the bottom of the positioning ring 88 may be bonded to the flexible diaphragm 72 to maintain the seal of the diaphragm at the points where the positioning pins pass through the diaphragm.

An annular reservoir 92 is defined by shaft 20, the bottom of lower flange 33 of bearing housing 30, the top of impeller hub 45, mounting ring 62 and rotating sealing ring 82. Fluid in the reservoir is carried to the sealed chamber 74 by way of a plurality of axial passage 76 which intersect an annular groove 78 in impeller hub 45, and thence through a plurality of radial passages 80 in mounting ring 62 which end at the sealed chamber.

Reservoir 92 is normally filled with lubricating liquid which has passed down the column pipe 22 through the bearings which position the shaft. Passage 94 in lower flange 33 of bearing housing 30 communicates with line 96 to allow for bleeding of the reservoir, or for filling of the reservoir with special fluids when these are required for unusual operating conditions. Pressure could also be applied directly to reservoir 92 through line 96.

During pump operations where high abrasive fluid is pumped, it is often necessary to insure that none of the abrasive patricles will enter the relative rotating seal surface of the seal since such occurances would significantly increase seal wear and possibly mar the seal surfaces to such an extent as to destroy the sealing effect. Therefore, for such operating conditions a flushing apparatus is easily attached or adapted to the seal assembly. As shown in the accompanying figures, the flushing apparatus consists of a flushing cover 98 disposed around the stationary sealing member 58. The flushing cover has an axial supply passage 100 leading of an annular reservoir section 102. The flushing liquid in the annular section is directed against the sealing ring 82 by passing through nozzle passages 104 communicating with the annular reservoir. A flushing line 106 connected to a supply of pressurized fresh water or other suitable liquid supplies flushing liquid to the flushing cover.

Figure 5:
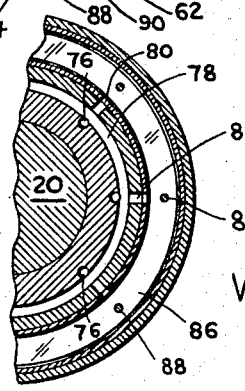
FIGURE 5 is a fragmentary view partially in vertical section of the lower suction end of the pump showing another embodiment of the shaft seal.

The embodiment of the invention shown in FIGURE 5 functions similarly to that shown in FIGURE 2. Items in FIGURE 5 which are similar to those shown in FIGURE 2 are similarly numbered for purposes of clarity.

In the seal assembly shown in FIGURE 5 impeller hub 45 has an upper flange 110 adapted for rotating seal ring 112 to be fixedly mounted thereon. Rotating seal ring 112 is fixed to upper flange 110 of impeller hub 45 by a screw connection. It should be understood that many other methods of connecting these elements, as well as other elements herein described, could be used, such as welding, brazing, pinning, etc.

A mounting ring 62 is fixedly attached to the bottom flange 33 of bearing housing 30 by shoulder 114 and retaining nut 64. Sealed chamber 74 in mounting ring 62 is again formed by flexible diaphragm 72 connected to the inner and outer walls 68 and 70, respectively of the annular groove in the mounting ring.

Non-rotating sealing ring 116 is fastened to positioning ring 86, which is mounted in mounting ring 62 by mounting pins 88. The mounting pins fit slidably in recesses 90 in the bottom of sealed chamber 74 to allow axial movement of the non-rotating sealing ring.

A reservoir 118 is defined by shaft 20, flange 110 of impeller hub 45, non-rotating sealing ring 116 and bottom flange 33 of bearing housing 30. As in the previous embodiment, fluid from reservoir 118 is carried to the sealed chamber 74, but in this instance by way of a plurality of axial passages 120 which intersect annular groove 122 in bottom flange 33 of bearing housing 30 and thence through radial passages 80 in mounting ring 62 to sealed chamber 74.

Line 96 leading to passage 94 in bottom flange 33 of bearing housing 30 can be used to bleed reservoir 118 or to provide fluid directly to the reservoir as in the previous embodiment. Similarly, flushing means as shown in FIGURE 2 are also included as shown in FIGURE 5 to prevent dirt and grit from marring the sealing surfaces of the relatively rotating sealing elements.

OPERATION

Taking first the embodiment shown in FIGURE 2, the reservoir section 92 is filled with lubricating liquid which is contained in the column pipe 22 to lubricate the bearings which position the drive shaft 20. The height of the liquid in column pipe 22 produces a constant static pressure on the liquid in the reservoir 92 whether the pump is operating or not. The presure is transmitted to the liquid in the sealed chamber 74 by means of the passage ways 76, 78 and 80. The flexible diaphragm 72 tends to expand the sealed chamber 74 in response to the pressure in the chamber and thereby urges rotating sealing ring 82 into operative coaction with the stationary sealing ring 58.

In addition to the static pressure in sealed chamber 74, dynamic pressure is also present during pump operating periods. The mounting ring 62 rotates with the impeller and thereby produces a centrifugal effect on the liquid in passages 78 and 80 and sealed chamber 74 which effect augments the static pressure in sealed chamber 74 previously described to increase the forces urging the rotating sealing ring 84 into operative coaction with stationary ring 58.

The embodiment of the invention shown in FIGURE 5 operates in a manner similar to that shown in FIGURE 2. The lubricating liquid in column pipe 22 exerts static pressure on the liquid in reservoir 118 which in turn is transmitted to sealed chamber 74 by way of passages 120, 122 and 80. The dynamic force acting to pressurize the liquid in chamber 74 is not as great in the previous embodiment, however, since the passage ways 118 and 120 and 80 from the reservoir 118 to sealed chamber 74 are not rotating with the impeller. Instead, the dynamic forces result solely from the increased head of the liquid in reservoir 118 due to the rotation thereof induced by the rotation of shaft 20 and impeller hub 45. This increased pressure is transmitted to the sealed chamber by way of the passage ways as previously mentioned.

It should be noted that the velocity of the liquid in reservoir 118 can be augmented by roughening the upper surface of impeller hub flange 110 or by placing vanes on the flange to act in a manner similar to a pump impeller. This would increase the dynamic pressure of the liquid in reservoir 118 which would be transmitted to sealed chamber 74 to augment the forces urging contact between the non-rotating sealing ring and the rotating sealing ring.

It will be understood that various changes in the details, the materials and arrangements of parts which have been herein described and illustrated in order to explain the nature of the invention may be made by those skilled in the art within the principal and scope and information as expressed in the appended claims.

What is claimed is:

1. A sealing apparatus comprising:
   (a) a housing for a shaft;
   (b) a shaft extended into the housing adapted to rotate therein;
   (c) non-rotating sealing ring means disposed about the shaft and connected to the housing;
   (d) rotating sealing ring means disposed about the shaft and connected to the shaft;
   (e) positioning means associated with said rotating sealing ring means to urge said rotating sealing ring means into operative sealing coaction with the other sealing ring means;
   (f) chamber means forming a chamber associated with said positioning means, said chamber means filled with fluid;
   (g) said chamber means including expandable means movable in response to changes in the pressure of the fluid in said chamber means;
   (h) said expandable means in operative association with said positioning means to actuate said positioning means upon pressurization of the fluid in said chamber means to urge said rotating sealing ring means into operative coaction with the other sealing ring means; and
   (i) means to pressurize the fluid in said chamber means.

2. The combination claimed in claim 1 wherein the means to pressurize the fluid in said chamber means comprise drive means to rotate said shaft in said housing whereby the fluid in said chamber means will be pressurized by centrifugal forces acting upon the fluid.

3. The combination claimed in claim 1 wherein the means to pressurize the fluid in said chamber means comprises:
   (a) supply means to provide fluid under pressure to said chamber means; and
   (b) conduit means communicating said supply means with said chamber means.

4. The combination claimed in claim 3 wherein:
   (a) said housing and said shaft are vertically disposed;
   (b) said supply means to provide fluid under pressure to said chamber means comprise a vertical tubular cavity defined by said housing and said shaft; and
   (c) said conduit means communicate said chamber means with said vertical tubular cavity below the top thereof to provide fluid under static pressure from the height of the fluid in said tubular cavity to said chamber.

5. The combination claimed in claim 1 wherein said positioning means comprise:
   (a) mounting ring means disposed adjacent the rotating sealing ring means;
   (b) means fixing said mounting ring means with relation to said shaft;
   (c) pin means extended from said rotating sealing ring means towards said mounting ring means; and
   (d) pin receptacle means in said mounting ring means adapted to receive said pin means in slidable engagement to allow the urging of said rotating sealing ring means into operative sealing contact with the other sealing ring means.

6. The combination claimed in claim 1 wherein chamber means forming a chamber associated with said positioning means comprise:
   (a) mounting ring means disposed adjacent the rotating sealing ring means;
   (b) means fixing said mounting ring means with relation to said shaft;
   (c) an annular channel in the face of said mounting ring means facing the rotating sealing ring means; and
   (d) said expandible means sealing the end of said annular channel proximate the associated sealing ring means.

7. The combination claimed in claim 6 wherein said expandible means comprise flexible diaphragm means extending from the inner wall of said channel to the outer wall of said channel, said diaphragm means adapted to expand upon the increase in pressure in the fluid in said chamber means.

8. The combination claimed in claim 7 wherein said positioning means comprises:
   (a) pin means extended from said rotating sealing ring means towards said mounting ring means;
   (b) pin receptacle means in the bottom of said annular channel adapted to receive said pin means in slidable engagement to allow the urging of said rotating sealing ring means into operative sealing contact with the other sealing ring means; and
   (c) said flexible diaphragm means adapted to allow said pin means to pass through said flexible diaphragm means while maintaining the seal of said chamber means.

9. The combination claimed in claim 8 wherein said means fixing said mounting ring means with relation to said shaft comprises means fixing said mounting ring means to said shaft.

10. In a vertical pump having a motor rotating a drive shaft to drive an impeller and a column pipe enclosing the drive shaft, a seal apparatus comprising:
    (a) rotating sealing ring means connected to the impeller;
    (b) non-rotating sealing ring means connected to said column pipe;
    (c) positioning means associated with at least one of said rotating and non-rotating sealing ring means to urge the associated sealing ring means into operative sealing coaction with the other sealing ring means, said positioning means comprising:
       (1) mounting ring means disposed adjacent the sealing ring means associated with said positioning means and remote from the sealing ring means not associated with said positioning means;
       (2) means fixing said mounting ring means with relation to said shaft;
       (3) an annular channel in the face of said mounting ring means facing the associated sealing ring means;
       (4) liquid filled chamber means associated with each of said positioning means;
       (5) said chamber means including expandible means movable in response to changes in the pressure of the liquid in said chamber means;
       (6) said expandible means sealing the end of the said annular channel proximate the associated sealing ring means;
    (d) said expandible means in operative association with said positioning means to actuate said positioning means upon pressurization of the liquid in said chamber means to urge the associated sealing ring means into operative coaction with the other sealing ring means; and
    (e) means to pressurize the liquid in said chamber.

11. The combination claimed in claim 10 wherein said expandible means comprise flexible diaphragm means extending from the inner wall of said channel to the outer wall of said channel, said diaphragm means adapted to expand upon increase in pressure of the liquid in said chamber means.

12. The combination claimed in claim 11 wherein the means to pressurize the liquid in said chamber means comprise:
(a) said non-rotating sealing ring means disposed adjacent to the bottom end of said column pipe;
(b) first passage means communicating said column pipe with said mounting ring means;
(c) second passage means in said mounting ring means communicating with said first passage means with said first passage means with said chamber means to provide communication between said column pipe and said chamber means; and
(d) said column pipe filled with liquid whereby the hydrostatic pressure exerted on the liquid in said column pipe is transmitted to the liquid in said chamber means through said first and second passage means.

13. The combination claimed in claim 12 wherein each of said positioning means comprise:
(a) positioning ring means fixed to the associated sealing ring means intermediate said associating sealing ring means and said mounting ring means;
(b) a plurality of pins extending from said positioning ring means towards said mounting ring means;
(c) a plurality of pin recepticles in the bottom of said annular channel disposed in correspondence with the pins extending from said positioning ring means, said pin receptions adapted to receive said pins in slidable engagement to allow the urging of the associated sealing ring means into operative sealed contact with the other sealing ring means; and
(d) said flexible diaphragm means adapted to allow said pin means to pass through said diaphragm means without destroying the seal of said chamber means.

14. The combination claimed in claim 13 wherein means to pressurize the liquid in said chamber means comprises means to rotate the liquid in said first passage means will be pressurized by centrifugal forces and this pressure transmitted by said second passage means to the liquid in said chamber means.

15. The combination claimed in claim 14 wherein the means to pressure the liquid in said chamber means further comprise means fixing said non-rotating sealing ring means to said impeller whereby said second passage means will rotate with said first and said liquid in said second passage means will be pressurized by centrifugal forces and this pressure transmitted to the liquid in said chamber means.

16. The combination claimed in claim 14 wherein the means to rotate the liquid in said first passage means comprises:
(a) a reservoir defined by said impeller, column pipe, mounting ring means and stationary sealing ring means; and
(b) means on said impeller projecting into said reservoir to rotate liquid in the reservoir.

References Cited
UNITED STATES PATENTS

| | | | |
|---|---|---|---|
| 2,679,611 | 1/1957 | Wernert. | |
| 2,949,321 | 8/1960 | Tracy | 103—111 |
| 2,919,148 | 12/1959 | Smith | 103—111 |
| 3,137,237 | 6/1964 | Zagar et al. | |
| 3,190,660 | 6/1965 | Koch. | |
| 2,149,974 | 3/1939 | McCormack | 277—88 |

HENRY F. RADUAZO, *Primary Examiner.*

U.S. Cl. X.R.

277—73